(12) United States Patent
Brauer et al.

(10) Patent No.: US 11,983,865 B2
(45) Date of Patent: May 14, 2024

(54) DEEP GENERATIVE MODEL-BASED ALIGNMENT FOR SEMICONDUCTOR APPLICATIONS

(71) Applicant: KLA Corporation, Milpitas, CA (US)

(72) Inventors: Bjorn Brauer, Beaverton, OR (US); Richard Wallingford, Ames, IA (US)

(73) Assignee: KLA Corp., Milpitas, CA (US)

( * ) Notice: Subject to any disclaimer, the term of this patent is extended or adjusted under 35 U.S.C. 154(b) by 394 days.

(21) Appl. No.: 17/308,878

(22) Filed: May 5, 2021

(65) Prior Publication Data
US 2022/0375051 A1 Nov. 24, 2022

(51) Int. Cl.
*G06T 7/00* (2017.01)
*G06T 7/33* (2017.01)

(52) U.S. Cl.
CPC .............. *G06T 7/001* (2013.01); *G06T 7/337* (2017.01); *G06T 2207/20081* (2013.01); *G06T 2207/20084* (2013.01); *G06T 2207/30148* (2013.01)

(58) Field of Classification Search
CPC ...................... G06T 7/001; G06T 7/337; G06T 2207/20081; G06T 2207/20084; G06T 2207/30148; G06T 2207/10056; G06T 7/33
See application file for complete search history.

(56) References Cited

U.S. PATENT DOCUMENTS

| | | | |
|---|---|---|---|
| 7,570,796 B2 | 8/2009 | Zafar et al. | |
| 7,676,077 B2 | 3/2010 | Kulkarni et al. | |
| 8,126,255 B2 | 2/2012 | Bhaskar et al. | |
| 8,664,594 B1 | 4/2014 | Jiang et al. | |
| 8,692,204 B2 | 4/2014 | Kojima et al. | |
| 8,698,093 B1 | 4/2014 | Gubbens et al. | |
| 8,716,662 B1 | 5/2014 | MacDonald et al. | |
| 9,222,895 B2 | 12/2015 | Duffy et al. | |
| 9,830,421 B2 | 11/2017 | Bhattacharyya et al. | |
| 10,620,135 B2 | 4/2020 | Brauer | |
| 10,698,325 B2 | 6/2020 | Brauer | |
| 2009/0198635 A1 | 8/2009 | Doddi et al. | |
| 2015/0324965 A1 | 11/2015 | Kulkarni et al. | |

(Continued)

OTHER PUBLICATIONS

Goodfellow et al., "Generative Adversarial Nets," arXiv:1406.2661, Jun. 10, 2014, 9 pages.

(Continued)

*Primary Examiner* — Samir A Ahmed
(74) *Attorney, Agent, or Firm* — Ann Marie Mewherter

(57) ABSTRACT

Methods and systems for deep learning alignment for semiconductor applications are provided. One method includes transforming first actual information for an alignment target on a specimen from either design data to a specimen image or a specimen image to design data by inputting the first actual information into a deep generative model such as a GAN. The method also includes aligning the transformed first actual information to second actual information for the alignment target, which has the same information type as the transformed first actual information. The method further includes determining an offset between the transformed first actual information and the second actual information based on results of the aligning and storing the determined offset as an align-to-design offset for use in a process performed on the specimen.

22 Claims, 8 Drawing Sheets

(56) References Cited

U.S. PATENT DOCUMENTS

| | | |
|---|---|---|
| 2016/0292840 A1 | 10/2016 | Konecky |
| 2017/0193400 A1* | 7/2017 | Bhaskar .................. G06N 3/08 |
| 2017/0194126 A1* | 7/2017 | Bhaskar ................ G06T 7/0004 |
| 2017/0357911 A1 | 12/2017 | Liu et al. |
| 2018/0293721 A1* | 10/2018 | Gupta ............. G01N 21/95607 |
| 2018/0330511 A1 | 11/2018 | Ha et al. |

OTHER PUBLICATIONS

Isola et al., "Image-to-Image Translation with Conditional Adversarial Networks," arXiv:1611.07004v2, Nov. 22, 2017, 17 pages.
Kingma et al., "Semi-supervised Learning with Deep Generative Models," NIPS 2014, Oct. 31, 2014, pp. 1-9.
Makhzani et al., "Adversarial Autoencoders," arXiv:1511.05644v2, May 25, 2016, 16 pages.
Mirza et al., "Conditional Generative Adversarial Nets," arXiv:1411.1784, Nov. 6, 2014, 7 pages.
International Search Report for PCT/US2022/026851 dated Aug. 10, 2022.

* cited by examiner

DEEP GENERATIVE MODEL-BASED ALIGNMENT FOR SEMICONDUCTOR APPLICATIONS

BACKGROUND OF THE INVENTION

1. Field of the Invention

The present invention generally relates to deep learning alignment for semiconductor applications. Certain embodiments relate to methods and systems for determining an offset for use in a process performed on a specimen.

2. Description of the Related Art

The following description and examples are not admitted to be prior art by virtue of their inclusion in this section.

An integrated circuit (IC) design may be developed using a method or system such as electronic design automation (EDA), computer aided design (CAD), and other IC design software. Such methods and systems may be used to generate the circuit pattern database from the IC design. The circuit pattern database includes data representing a plurality of layouts for various layers of the IC. Data in the circuit pattern database may be used to determine layouts for a plurality of reticles. A layout of a reticle generally includes a plurality of polygons that define features in a pattern on the reticle. Each reticle is used to fabricate one of the various layers of the IC. The layers of the IC may include, for example, a junction pattern in a semiconductor substrate, a gate dielectric pattern, a gate electrode pattern, a contact pattern in an interlevel dielectric, and an interconnect pattern on a metallization layer.

Fabricating semiconductor devices such as logic and memory devices typically includes processing a substrate such as a semiconductor wafer using a large number of semiconductor fabrication processes to form various features and multiple levels of the semiconductor devices. For example, lithography is a semiconductor fabrication process that involves transferring a pattern from a reticle to a resist arranged on a semiconductor wafer. Additional examples of semiconductor fabrication processes include, but are not limited to, chemical-mechanical polishing (CMP), etch, deposition, and ion implantation. Multiple semiconductor devices may be fabricated in an arrangement on a single semiconductor wafer and then separated into individual semiconductor devices.

Inspection processes are used at various steps during a semiconductor manufacturing process to detect defects on wafers to promote higher yield in the manufacturing process and thus higher profits. Inspection has always been an important part of fabricating semiconductor devices such as ICs. As design rules shrink, however, semiconductor manufacturing processes may be operating closer to the limitations on the performance capability of the processes. In addition, smaller defects can have an impact on the electrical parameters of the device as the design rules shrink, which drives more sensitive inspections. Therefore, as design rules shrink, the population of potentially yield relevant defects detected by inspection grows dramatically, and the population of nuisance defects detected by inspection also increases dramatically.

Inspection systems and methods are increasingly being designed to focus on the relationship between defect and design since it is the impact on the design for a specimen that will determine whether and how much a defect matters. For example, some methods have been developed for aligning inspection and design coordinates. One such method depends on the accuracy of the inspection system coordinate registration to design. Another such method involves conducting post-processing alignment on the inspection image patch and associated design clip.

Some currently used methods perform patch-to-design alignment (PDA) training based on a setup die on a setup wafer, and a physics-based model is used to render the images, as shown in FIG. 10. For example, as shown in step 1000 of FIG. 10, the currently used methods may scan a specimen to find alignment targets. As shown in step 1002, the methods may acquire design for each target. Using images generating during the scanning and the design acquired for each target, the currently used methods may learn image rendering parameters from example targets, as shown in step 1004. The currently used methods may then render an image from design at each target, as shown in step 1006, using the learned image rendering parameters. As shown in step 1008, the currently used methods may align the rendered image and specimen image at each target. The currently used methods may then determine design-to-image offsets for each target, as shown in step 1010, and save the targets and offset to a database for runtime inspection, as shown in step 1012. The runtime PDA process may then be performed in any suitable manner.

While the currently used methods for setting up and performing PDA have proved useful in a number of applications, there are a number of disadvantages to such methods and systems. For example, good targets need to be found in order to create a physics-based model and render the images. Such methods and systems are also based on a number of assumptions including that the design file available for the PDA setup includes all of the required layers (i.e., all of the layers needed to render images that sufficiently resemble the real images) and that good alignment targets can be found. However, for many reasons, design data may not be available for all of the layers needed to simulate good images. In addition, it sometimes happens that there are no or not enough of such good alignment targets. In either or both cases, it can be difficult to create the physics-based model to find the best rendering parameters.

Accordingly, it would be advantageous to develop systems and methods for determining an offset for use in a process performed on a specimen that do not have one or more of the disadvantages described above.

SUMMARY OF THE INVENTION

The following description of various embodiments is not to be construed in any way as limiting the subject matter of the appended claims.

One embodiment relates to a system configured to determine an offset for use in a process performed on a specimen. The system includes one or more computer subsystems and one or more components executed by the one or more computer subsystems. The one or more components include a deep generative model. The one or more computer subsystems are configured for transforming first actual information for an alignment target on a specimen from a first type of information to a second type of information by inputting the first actual information into the deep generative model. If the first type of information is design data, then the second type of information is a specimen image. If the first type of information is a specimen image, then the second type of information is design data. The one or more computer subsystems are also configured for aligning the transformed first actual information to second actual information for the alignment target, and the second actual information is the second type of information. The one or more computer subsystems are further configured for determining an offset between the transformed first actual information and the second actual information based on results of the aligning and storing the determined offset as an align-to-design offset for use in a process performed on the specimen with an output acquisition subsystem. The system may be further configured as described herein.

Another embodiment relates to a computer-implemented method for determining an offset for use in a process performed on a specimen. The method includes the transforming, aligning, determining, and storing steps described above, which are performed by one or more computer systems. Each of the steps of the method may be performed as described further herein. In addition, the method described above may include any other step(s) of any other method(s) described herein. Furthermore, the method may be performed by any of the systems described herein.

An additional embodiment relates to a non-transitory computer-readable medium storing program instructions executable on one or more computer systems for performing a computer-implemented method for determining an offset for use in a process performed on a specimen. The computer-implemented method includes the steps of the method described above. The computer-readable medium may be further configured as described herein. The steps of the computer-implemented method may be performed as described further herein. In addition, the computer-implemented method for which the program instructions are executable may include any other step(s) of any other method(s) described herein.

BRIEF DESCRIPTION OF THE DRAWINGS

Further advantages of the present invention will become apparent to those skilled in the art with the benefit of the following detailed description of the preferred embodiments and upon reference to the accompanying drawings in which.

Figure 1:
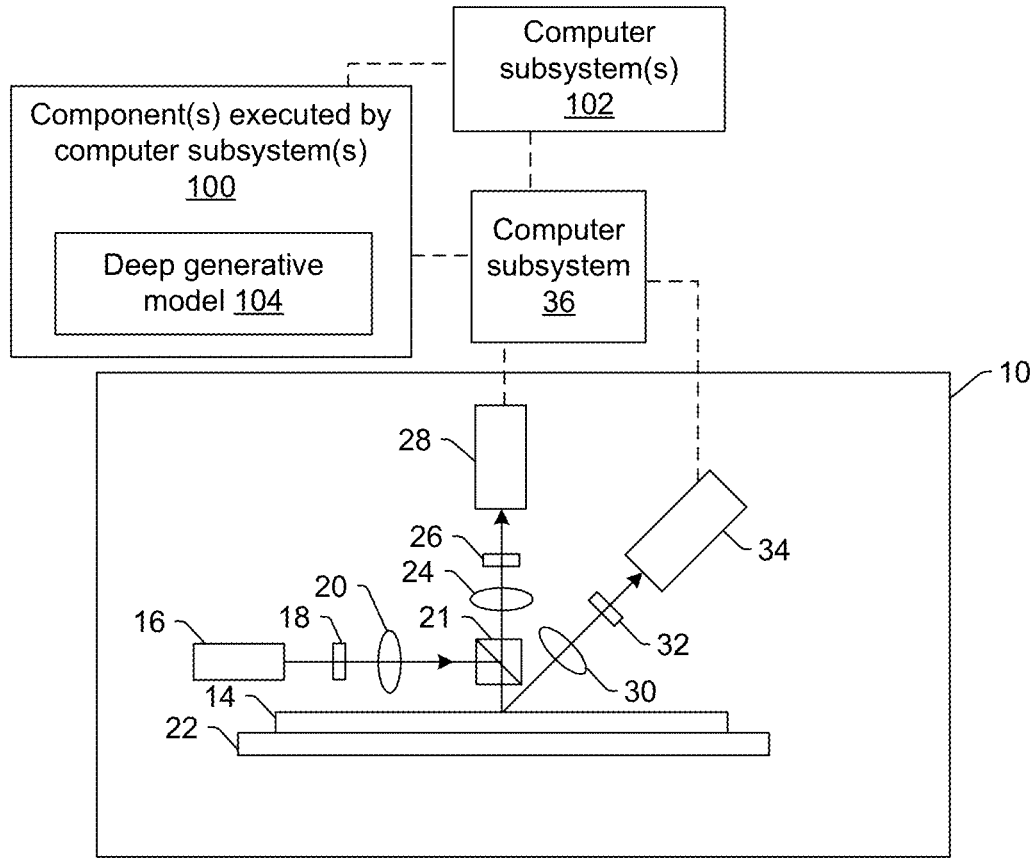
FIGS. 1 and 2 are schematic diagrams illustrating side views of embodiments of a system configured as described herein.

While the invention is susceptible to various modifications and alternative forms, specific embodiments thereof are shown by way of example in the drawings and are herein described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

The terms "design," "design data," and "design information" as used interchangeably herein generally refer to the physical design (layout) of an IC or other semiconductor device and data derived from the physical design through complex simulation or simple geometric and Boolean operations. The design may include any other design data or design data proxies described in commonly owned U.S. Pat. No. 7,570,796 issued on Aug. 4, 2009 to Zafar et al. and 7,676,077 issued on Mar. 9, 2010 to Kulkarni et al., both of which are incorporated by reference as if fully set forth herein. In addition, the design data can be standard cell library data, integrated layout data, design data for one or more layers, derivatives of the design data, and full or partial chip design data. Furthermore, the "design," "design data," and "design information" described herein refers to information and data that is generated by semiconductor device designers in a design process and is therefore available for use in the embodiments described herein well in advance of printing of the design on any physical specimens such as reticles and wafers.

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals. Unless otherwise noted herein, any of the elements described and shown may include any suitable commercially available elements.

One embodiment relates to a system configured to determine an offset for use in a process performed on a specimen. The offsets determined by the embodiments described herein can be used for applications such as IC design to optical (or other) image alignment through deep generative models. One embodiment of such a system is shown in FIG. 1. The system includes one or more computer subsystems (e.g., computer subsystems 36 and 102) and one or more components 100 executed by the one or more computer subsystems. The one or more components include deep generative model 104, which is configured as described further herein.

In some embodiments, the specimen is a wafer. The wafer may include any wafer known in the semiconductor arts. Although some embodiments may be described herein with respect to a wafer or wafers, the embodiments are not limited in the specimens for which they can be used. For example, the embodiments described herein may be used for specimens such as reticles, flat panels, personal computer (PC) boards, and other semiconductor specimens.

In some embodiments, the system includes an output acquisition subsystem that includes at least an energy source and a detector. The energy source is configured to generate energy that is directed to a specimen. The detector is configured to detect energy from the specimen and to generate output responsive to the detected energy.

In one embodiment, the output acquisition subsystem is a light-based output acquisition subsystem. For example, in the embodiment of the system shown in FIG. 1, output acquisition subsystem 10 includes an illumination subsystem configured to direct light to specimen 14. The illumination subsystem includes at least one light source. For example, as shown in FIG. 1, the illumination subsystem includes light source 16. In one embodiment, the illumination subsystem is configured to direct the light to the specimen at one or more angles of incidence, which may include one or more oblique angles and/or one or more normal angles. For example, as shown in FIG. 1, light from light source 16 is directed through optical element 18 and then lens 20 to beam splitter 21, which directs the light to specimen 14 at a normal angle of incidence. The angle of incidence may include any suitable angle of incidence, which may vary depending on, for instance, characteristics of the specimen, the defects to be detected on the specimen, the measurements to be performed on the specimen, etc.

The illumination subsystem may be configured to direct the light to the specimen at different angles of incidence at different times. For example, the output acquisition subsystem may be configured to alter one or more characteristics of one or more elements of the illumination subsystem such that the light can be directed to the specimen at an angle of incidence that is different than that shown in FIG. 1. In one such example, the output acquisition subsystem may be configured to move light source 16, optical element 18, and lens 20 such that the light is directed to the specimen at a different angle of incidence.

In some instances, the output acquisition subsystem may be configured to direct light to the specimen at more than one angle of incidence at the same time. For example, the output acquisition subsystem may include more than one illumination channel, one of the illumination channels may include light source 16, optical element 18, and lens 20 as shown in FIG. 1 and another of the illumination channels (not shown) may include similar elements, which may be configured differently or the same, or may include at least a light source and possibly one or more other components such as those described further herein. If such light is directed to the specimen at the same time as the other light, one or more characteristics (e.g., wavelength, polarization, etc.) of the light directed to the specimen at different angles of incidence may be different such that light resulting from illumination of the specimen at the different angles of incidence can be discriminated from each other at the detector(s).

In another instance, the illumination subsystem may include only one light source (e.g., source 16 shown in FIG. 1) and light from the light source may be separated into different optical paths (e.g., based on wavelength, polarization, etc.) by one or more optical elements (not shown) of the illumination subsystem. Light in each of the different optical paths may then be directed to the specimen. Multiple illumination channels may be configured to direct light to the specimen at the same time or at different times (e.g., when different illumination channels are used to sequentially illuminate the specimen). In another instance, the same illumination channel may be configured to direct light to the specimen with different characteristics at different times. For example, in some instances, optical element 18 may be configured as a spectral filter and the properties of the spectral filter can be changed in a variety of different ways (e.g., by swapping out the spectral filter) such that different wavelengths of light can be directed to the specimen at different times. The illumination subsystem may have any other suitable configuration known in the art for directing light having different or the same characteristics to the specimen at different or the same angles of incidence sequentially or simultaneously.

In one embodiment, light source 16 may include a broadband plasma (BBP) light source. In this manner, the light generated by the light source and directed to the specimen may include broadband light. However, the light source may include any other suitable light source such as a laser, which may be any suitable laser known in the art and may be configured to generate light at any suitable wavelength(s) known in the art. In addition, the laser may be configured to generate light that is monochromatic or nearly-monochromatic. In this manner, the laser may be a narrowband laser. The light source may also include a polychromatic light source that generates light at multiple discrete wavelengths or wavebands.

Light from optical element 18 may be focused to beam splitter 21 by lens 20. Although lens 20 is shown in FIG. 1 as a single refractive optical element, in practice, lens 20 may include a number of refractive and/or reflective optical elements that in combination focus the light from the optical element to the specimen. The illumination subsystem shown in FIG. 1 and described herein may include any other suitable optical elements (not shown). Examples of such optical elements include, but are not limited to, polarizing component(s), spectral filter(s), spatial filter(s), reflective optical element(s), apodizer(s), beam splitter(s), aperture(s), and the like, which may include any such suitable optical elements known in the art. In addition, the system may be configured to alter one or more elements of the illumination subsystem based on the type of illumination to be used for inspection, metrology, etc.

The output acquisition subsystem may also include a scanning subsystem configured to cause the light to be scanned over the specimen. For example, the output acquisition subsystem may include stage 22 on which specimen 14 is disposed during inspection, measurement, etc. The scanning subsystem may include any suitable mechanical and/or robotic assembly (that includes stage 22) that can be configured to move the specimen such that the light can be scanned over the specimen. In addition, or alternatively, the output acquisition subsystem may be configured such that one or more optical elements of the output acquisition subsystem perform some scanning of the light over the specimen. The light may be scanned over the specimen in any suitable fashion.

The output acquisition subsystem further includes one or more detection channels. At least one of the one or more detection channels includes a detector configured to detect light from the specimen due to illumination of the specimen by the output acquisition subsystem and to generate output responsive to the detected light. For example, the output acquisition subsystem shown in FIG. 1 includes two detection channels, one formed by collector 24, element 26, and detector 28 and another formed by collector 30, element 32, and detector 34. As shown in FIG. 1, the two detection channels are configured to collect and detect light at different angles of collection. In some instances, one detection channel is configured to detect specularly reflected light, and the other detection channel is configured to detect light that is not specularly reflected (e.g., scattered, diffracted, etc.) from the specimen. However, two or more of the detection channels may be configured to detect the same type of light from the specimen (e.g., specularly reflected light). Although FIG. 1 shows an embodiment of the output acquisition subsystem that includes two detection channels, the output acquisition subsystem may include a different number of detection channels (e.g., only one detection channel or two or more detection channels). Although each of the collectors are shown in FIG. 1 as single refractive optical elements, each of the collectors may include one or more refractive optical element(s) and/or one or more reflective optical element(s).

The one or more detection channels may include any suitable detectors known in the art. For example, the detectors may include photo-multiplier tubes (PMTs) or any other suitable non-imaging detectors known in the art. If the detectors are non-imaging detectors, each of the detectors may be configured to detect certain characteristics of the scattered light such as intensity but may not be configured to detect such characteristics as a function of position within the imaging plane. As such, the output that is generated by each of the detectors included in each of the detection channels may be signals or data, but not image signals or image data. In such instances, a computer subsystem such as computer subsystem 36 of the system may be configured to generate images of the specimen from the non-imaging output of the detectors.

It is noted that FIG. 1 is provided herein to generally illustrate a configuration of an output acquisition subsystem that may be included in the system embodiments described herein. Obviously, the output acquisition subsystem configuration described herein may be altered to optimize the performance of the system as is normally performed when designing a commercial inspection, metrology, etc. system. In addition, the systems described herein may be implemented using an existing inspection or metrology system (e.g., by adding functionality described herein to an existing inspection or metrology system) such as the 29xx and 39xx series of tools, the SpectraShape family of tools, and the Archer series of tools that are commercially available from KLA Corp., Milpitas, Calif. For some such systems, the embodiments described herein may be provided as optional functionality of the system (e.g., in addition to other functionality of the system). Alternatively, the output acquisition subsystem described herein may be designed "from scratch" to provide a completely new system.

Computer subsystem 36 of the system may be coupled to the detectors of the output acquisition subsystem in any suitable manner (e.g., via one or more transmission media, which may include "wired" and/or "wireless" transmission media) such that the computer subsystem can receive the output generated by the detectors during scanning of the specimen. Computer subsystem 36 may be configured to perform a number of functions using the output of the detectors as described herein and any other functions described further herein. This computer subsystem may be further configured as described herein.

This computer subsystem (as well as other computer subsystems described herein) may also be referred to herein as computer system(s). Each of the computer subsystem(s) or system(s) described herein may take various forms, including a personal computer system, image computer, mainframe computer system, workstation, network appliance, Internet appliance, or other device. In general, the term "computer system" may be broadly defined to encompass any device having one or more processors, which executes instructions from a memory medium. The computer subsystem(s) or system(s) may also include any suitable processor known in the art such as a parallel processor. In addition, the computer subsystem(s) or system(s) may include a computer platform with high speed processing and software, either as a standalone or a networked tool.

If the system includes more than one computer subsystem, the different computer subsystems may be coupled to each other such that images, data, information, instructions, etc. can be sent between the computer subsystems as described further herein. For example, computer subsystem 36 may be coupled to computer subsystem(s) 102 (as shown by the dashed line in FIG. 1) by any suitable transmission media, which may include any suitable wired and/or wireless transmission media known in the art. Two or more of such computer subsystems may also be effectively coupled by a shared computer-readable storage medium (not shown).

Although the output acquisition subsystem is described above as being an optical or light-based subsystem, the output acquisition subsystem may be an electron beam-based subsystem. For example, in one embodiment, the output acquisition subsystem is an electron beam output acquisition subsystem. In this manner, the energy source may be an electron beam source. In one such embodiment shown in FIG. 2, the output acquisition subsystem includes electron column 122, which is coupled to computer subsystem 124.

Figure 2:
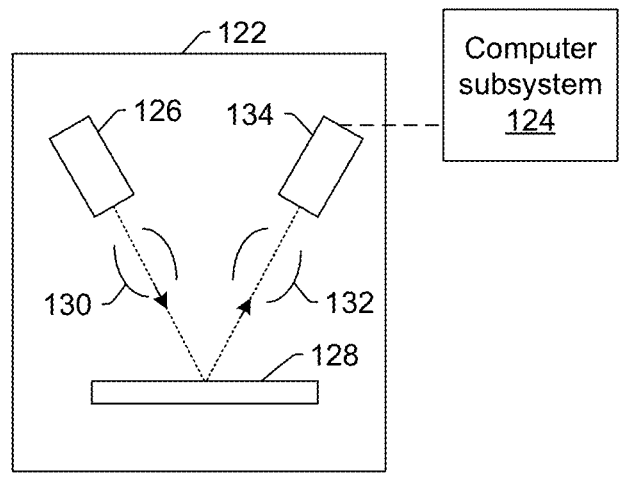

As also shown in FIG. 2, the electron column includes electron beam source 126 configured to generate electrons that are focused to specimen 128 by one or more elements 130. The electron beam source may include, for example, a cathode source or emitter tip, and one or more elements 130 may include, for example, a gun lens, an anode, a beam limiting aperture, a gate valve, a beam current selection aperture, an objective lens, and a scanning subsystem, all of which may include any such suitable elements known in the art.

Electrons returned from the specimen (e.g., secondary electrons) may be focused by one or more elements 132 to detector 134. One or more elements 132 may include, for example, a scanning subsystem, which may be the same scanning subsystem included in element(s) 130.

The electron column may include any other suitable elements known in the art. In addition, the electron column may be further configured as described in U.S. Pat. No. 8,664,594 issued Apr. 4, 2014 to Jiang et al., U.S. Pat. No. 8,692,204 issued Apr. 8, 2014 to Kojima et al., U.S. Pat. No. 8,698,093 issued Apr. 15, 2014 to Gubbens et al., and 8,716,662 issued May 6, 2014 to MacDonald et al., which are incorporated by reference as if fully set forth herein.

Although the electron column is shown in FIG. 2 as being configured such that the electrons are directed to the specimen at an oblique angle of incidence and are scattered from the specimen at another oblique angle, it is to be understood that the electron beam may be directed to and scattered from the specimen at any suitable angles. In addition, the electron beam subsystem may be configured to use multiple modes to generate images of the specimen (e.g., with different illumination angles, collection angles, etc.). The multiple modes of the electron beam subsystem may be different in any image generation parameter(s) of the subsystem.

Computer subsystem 124 may be coupled to detector 134 as described above. The detector may detect electrons returned from the surface of the specimen thereby generating output used by the computer subsystem(s) to form electron beam images of the specimen, which may include any suitable electron beam images. Computer subsystem 124 may be configured to perform any of the functions described herein using the output of the detector and/or the electron beam images. Computer subsystem 124 may be configured to perform any additional step(s) described herein. A system that includes the output acquisition subsystem shown in FIG. 2 may be further configured as described herein.

It is noted that FIG. 2 is provided herein to generally illustrate a configuration of an electron beam-based output acquisition subsystem that may be included in the embodiments described herein. As with the optical subsystem described above, the electron beam subsystem configuration described herein may be altered to optimize the performance of the subsystem as is normally performed when designing a commercial inspection or metrology system. In addition, the systems described herein may be implemented using an existing inspection, metrology, or other system (e.g., by adding functionality described herein to an existing system) such as tools that are commercially available from KLA. For some such systems, the embodiments described herein may be provided as optional functionality of the system (e.g., in addition to other functionality of the system). Alternatively, the system described herein may be designed "from scratch" to provide a completely new system.

Although the output acquisition subsystem is described above as being a light-based or electron beam-based subsystem, the output acquisition subsystem may be an ion beam-based subsystem. Such an output acquisition subsystem may be configured as shown in FIG. 2 except that the electron beam source may be replaced with any suitable ion beam source known in the art. In one embodiment, therefore, the energy directed to the specimen includes ions. In addition, the output acquisition subsystem may be any other suitable ion beam-based output acquisition subsystem such as those included in commercially available focused ion beam (FIB) systems, helium ion microscopy (HIM) systems, and secondary ion mass spectroscopy (SIMS) systems.

The output acquisition subsystems described herein may be configured to generate output for the specimen with multiple modes. In general, a "mode" is defined by the values of parameters of the output acquisition subsystem used for generating the images of the specimen. Therefore, modes may be different in the values for at least one of the parameters of the output acquisition subsystem (other than position on the specimen at which the output is generated). For example, in an optical subsystem, different modes may use different wavelength(s) of light for illumination. The modes may be different in the illumination wavelength(s) as described further herein (e.g., by using different light sources, different spectral filters, etc.) for different modes. In another embodiment, different modes may use different illumination channels of the optical subsystem. For example, as noted above, the optical subsystem may include more than one illumination channel. As such, different illumination channels may be used for different modes. The modes may be different in any one or more alterable parameters (e.g., illumination polarization(s), angle(s), wavelength(s), etc., detection polarization(s), angle(s), wavelength(s), etc.) of the output acquisition subsystem.

In a similar manner, the output generated by the electron beam subsystem may include output generated by the electron beam subsystem with two or more different values of a parameter of the electron beam subsystem. The multiple modes of the electron beam subsystem can be defined by the values of parameters of the electron beam subsystem used for generating output for a specimen. Therefore, modes that are different may be different in the values for at least one of the electron beam parameters of the electron beam subsystem. For example, in one embodiment of an electron beam subsystem, different modes may use different angles of incidence for illumination.

The output acquisition subsystem embodiments described herein may be configured for inspection, metrology, defect review, or another quality control related process performed on the specimen. For example, the embodiments of the output acquisition subsystems described herein and shown in FIGS. 1 and 2 may be modified in one or more parameters to provide different output generation capability depending on the application for which they will be used. In one such example, the output acquisition subsystem shown in FIG. 1 may be configured to have a higher resolution if it is to be used for defect review or metrology rather than for inspection. In other words, the embodiments of the output acquisition subsystems shown in FIGS. 1 and 2 describe some general and various configurations for an output acquisition subsystem that can be tailored in a number of manners that will be obvious to one skilled in the art to produce output acquisition subsystems having different output generation capabilities that are more or less suitable for different applications.

As noted above, the optical, electron, and ion beam subsystems are configured for scanning energy (e.g., light, electrons, etc.) over a physical version of the specimen thereby generating output for the physical version of the specimen. In this manner, the optical, electron, and ion beam subsystems may be configured as "actual" subsystems, rather than "virtual" subsystems. However, a storage medium (not shown) and computer subsystem(s) 102 shown in FIG. 1 may be configured as a "virtual" system. In particular, the storage medium and the computer subsystem(s) may be configured as a "virtual" inspection system as described in commonly assigned U.S. Pat. No. 8,126,255 issued on Feb. 28, 2012 to Bhaskar et al. and 9,222,895 issued on Dec. 29, 2015 to Duffy et al., both of which are incorporated by reference as if fully set forth herein. The embodiments described herein may be further configured as described in these patents.

As mentioned above, the one or more components that are executed by the one or more computer subsystems include a deep generative model, e.g., deep generative model 104 shown in FIG. 1. Generally speaking, "deep learning" (DL) (also known as deep structured learning, hierarchical learning or deep machine learning) is a branch of machine learning (ML) based on a set of algorithms that attempt to model high level abstractions in data. In a simple case, there may be two sets of neurons: ones that receive an input signal and ones that send an output signal. When the input layer receives an input, it passes on a modified version of the input to the next layer. In a DL-based model, there are many layers between the input and output (and the layers are not made of neurons but it can help to think of it that way), allowing the algorithm to use multiple processing layers, composed of multiple linear and non-linear transformations.

DL is part of a broader family of ML methods based on learning representations of data. An observation (e.g., an image) can be represented in many ways such as a vector of intensity values per pixel, or in a more abstract way as a set of edges, regions of particular shape, etc. Some representations are better than others at simplifying the learning task (e.g., face recognition or facial expression recognition). One of the promises of DL is replacing handcrafted features with efficient algorithms for unsupervised or semi-supervised feature learning and hierarchical feature extraction.

A "generative" model can be generally defined as a model that is probabilistic in nature. In other words, a "generative" model is not one that performs forward simulation or rule-based approaches and, as such, a model of the physics of the processes involved in generating an actual image is not necessary. Instead, as described further herein, the generative model can be learned (in that its parameters can be learned) based on a suitable training set of data. The generative model may be configured to have a DL architecture, which may include multiple layers that perform a number of algorithms or transformations. The number of layers included in the generative model may be use case dependent. For practical purposes, a suitable range of layers is from 2 layers to a few tens of layers. Deep generative models that learn the joint probability distribution (mean and variance) between the specimen images (e.g., images of actual wafer) and design (e.g., CAD or a vector representation of intended layout) can be configured as described further herein.

In one embodiment, the deep generative model is a generative adversarial network (GAN). In another embodiment, the deep generative model is a conditional generative adversarial network (cGAN). The deep generative model may also include any other suitable type of GAN known in the art.

In general, GANs consist of two adversarial models, a generative model, G, capturing the data distribution, and a discriminative model, D, estimating the probability that a given sample comes from the training data rather than G. G and D could be a multi-layer perceptron, i.e. a non-linear mapping function. The generator builds a mapping function from a prior noise distribution $p_z(Z)$ to the data space $G(z; \theta_g)$ in order to learn a generator distribution $p_g$ over the data x where G is a differentiable function represented by a multilayer perceptron with parameters $\theta_g$. The generator is trained to produce simulated output that cannot be distinguished from the real data distribution or ground truth data distribution. The adversarially trained discriminator is trained to detect fakes which are created by the generator. Both the generator and the discriminator are trained as good as possible so that the generator produces extremely good "faked" output.

When extending GANs to a conditional model (cGAN), the discriminator and the generator are both conditioned on some extra information, y, by feeding y into the discriminator and the generator as an additional input layer.

GANs are inspired by game theory where a generator G and a critic, i.e., Discriminator D, are competing with each other to make each other stronger. The goal is to make the generated data distribution $p_g$ as similar as possible to the real sample distribution $p_r$ evaluated by the Jensen-Shannon divergence:

$$D_{JS}(p_g \| p_r) = \frac{1}{2} D_{KL}\left(p_g \left\| \frac{p_g + p_r}{2}\right.\right) + \frac{1}{2} D_{KL}\left(p_r \left\| \frac{p_g + p_r}{2}\right.\right)$$

where $D_{KL}$ is the Kullback-Leibler divergence defined as follows:

$$D_{KL}\left(p_g \left\| \frac{p_g + p_r}{2}\right.\right) = \int_{x_1}^{x_2} p_g(x) \log \frac{2p_g(x)}{p_g(x) + p_r(x)} dx \text{ and}$$

$$D_{KL}\left(p_r \left\| \frac{p_g + p_r}{2}\right.\right) = \int_{x_1}^{x_2} p_r(x) \log \frac{2p_r(x)}{p_g(x) + p_r(x)} dx$$

The generator outputs synthetic samples given a random noise variable input z. Over time, the generator gets trained to capture the real data distribution by having the discriminator reject images which it considers as being bad fakes.

For conditional GANs, the Generator and Discriminator are conditioned on some extra information, y, which will be the design clip or specimen images in the embodiments described herein. The following minimax game with the objective L(D,G) is describing the setting:

$$\min_G \max_D L(D, G) = \mathbb{E}_{x \sim p_r(x)}(\log D(x|y)) + \mathbb{E}_{z \sim p_z(z)}(\log(1 - D(G(z|y))))$$

$$= \mathbb{E}_{x \sim p_r(x)}(\log D(x|y)) + \mathbb{E}_{x \sim p_g(x)}(\log(1 - D(x|y)))$$

This means that G is trained to increase chances of D producing a high probability for a faked example, thus minimizing $\mathbb{E}_{x \sim p_g(x)}(\log(1 - D(x|y)))$. We also need to make sure that the discriminator decisions over real data are accurate by maximizing the encoding $\mathbb{E}_{x \sim p_r(x)}(\log D(x|y))$ and given a fake sample G(z), the discriminator is expected to output a probability, D(G(z)), close to zero by maximizing $\mathbb{E}_{z \sim p_z(z)}(\log(1 - D(G(z|y))))$.

The one or more computer subsystems are configured for transforming first actual to information for an alignment target on a specimen from a first type of information to a second type of information by inputting the first actual information into the deep generative model. The one or more computer subsystems may input the first actual information into the deep generative model in any suitable manner.

"Actual information" as that term is used herein refers to information that has not been simulated by a DL or ML model including those described herein but instead is acquired from a source other than the models described herein. The possible sources of the actual information in the embodiments described herein include a design database, file, storage medium, etc. or a specimen imaging tool such as those described herein.

The terms "first" and "second" as used herein are not intended to have any connotation other than to indicate different things. As described further herein, the first and second types of information are different types of information, where in general either the first or second type of information is design data and the other of the first and second types of information is specimen images. In this manner, different types of information as that term is used herein is not intended to mean the same type of information with different characteristics. For example, the different types of information as that term is used herein is not intended to mean the same type of specimen images (e.g., optical images) with different resolutions or other different image characteristics. Instead, the different types of information described herein are in different domains such as design data space vs. specimen image space.

Many semiconductor quality control type applications currently used in the art provide improved results by using design data to perform certain functions like defect detection and classification among others. In order for the design data to be useful for any of these functions, it has to be properly aligned to the results generated for a specimen by the quality control tool. For example, unless a specimen image is properly aligned to design data, which parts of the image correspond to which parts of the design cannot be accurately determined. One difficulty in performing such alignment is that a specimen image often does not much look like its corresponding design, which can be due to a number of factors including how the structures in the design are formed on the specimen and the ability of the tool to image the structures. In other words, specimen images can have substantially different image characteristics than corresponding design data, which can make aligning the corresponding specimen images and design data particularly difficult. In most cases, it is impossible to change the characteristics of the specimen images to make image-to-design alignment easier. Therefore, creative and better ways to make that alignment possible are constantly being explored. The embodiments described herein advantageously provide better alignment for specimens that have a design to image mismatch such as that described above.

Figure 3:
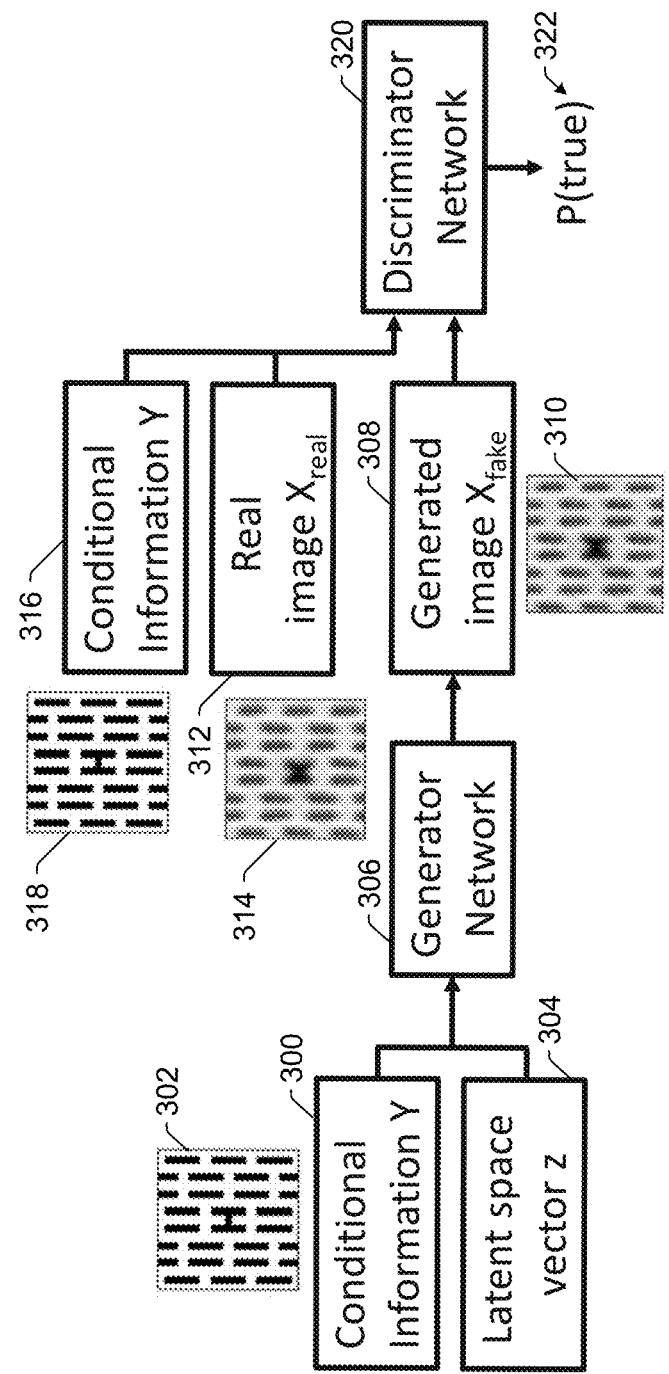
FIGS. 3-4 are flow charts illustrating steps that may be performed by the embodiments described herein.

If the first type of information is design data, then the second type of information is a specimen image. FIG. 3 shows cGAN training performed by providing the generator network with a design image. In particular, as shown in FIG. 3, conditional information Y 300 (extra data such as design image 302 or a conditional image) is input to generator network 306 along with latent space vector z 304. As a result, generator network 306 outputs generated image $X_{fake}$ 308, which is a simulated specimen image, e.g., simulated specimen image 310. Real image $X_{real}$ 312, in this case, is actual optical image 314 of a specimen at a location on the specimen at which the portion of the design shown in design image 302 is formed. In this manner, conditional information Y 300 such as a design image may be a training input in a training set, and real image $X_{real}$ 312 may be its corresponding image of a specimen designated as a training output in the training set.

The latent space vector may have any suitable configuration known in the art. In general, the latent space vector represents an initial image that simply consists of noise, i.e., pixels with randomly assigned grey level values. For computational reasons, this image is stored as a vector by stitching each row in the image next to each other so that a 2D image, e.g., 32 pixels by 32 pixels, becomes a correspondingly sized vector, e.g., a 1×1024 sized vector. Some information (e.g., color) may be added to this randomness to guide the deep generative model into a certain direction.

Generated image $X_{fake}$ 308 and conditional information Y 300 are combined as a first input to discriminator network 320. Real image $X_{real}$ 312 and conditional information Y 316, (e.g., design image 318) are combined as a second input to discriminator network 320. Conditional information Y 300 and 316 are different instances of the same portion of the same design in this case. The discriminator network may generate output that is input to a loss function (not shown), which may produce output P(True) 322, which is the probability that the generated patch image is a true or good "faked" image.

Each of the design, real, and generated images shown in the figures is not meant to illustrate any particular specimen(s) or characteristics thereof for which the embodiments described herein may be used. In a similar manner, each of the real and generated images shown in the figures is not meant to illustrate any particular actual or simulated images that may be generated for specimen(s). Instead, the design, real, and generated images shown in the figures are merely intended to promote understanding of the embodiments described herein. The images actually input and output from the generator will vary depending on the specimen and its characteristics, which are related to its design, and the configuration of the imaging system that generates the actual images for the specimen(s), which are used to train the GAN thereby affecting the simulated images that are generated by the GAN.

The loss function may be any suitable loss function known in the art such as that disclosed by Isola et al., in "Image-to-Image Translation with Conditional Adversarial Networks," The IEEE Conference on Computer Vision and Pattern Recognition (CVPR), 2017, pp. 1125-1134, which is incorporated by reference as if fully set forth herein. The embodiments described herein may be further configured as described in this reference. The generator and discriminator networks shown in FIG. 3 may be further configured as described herein.

Figure 4:
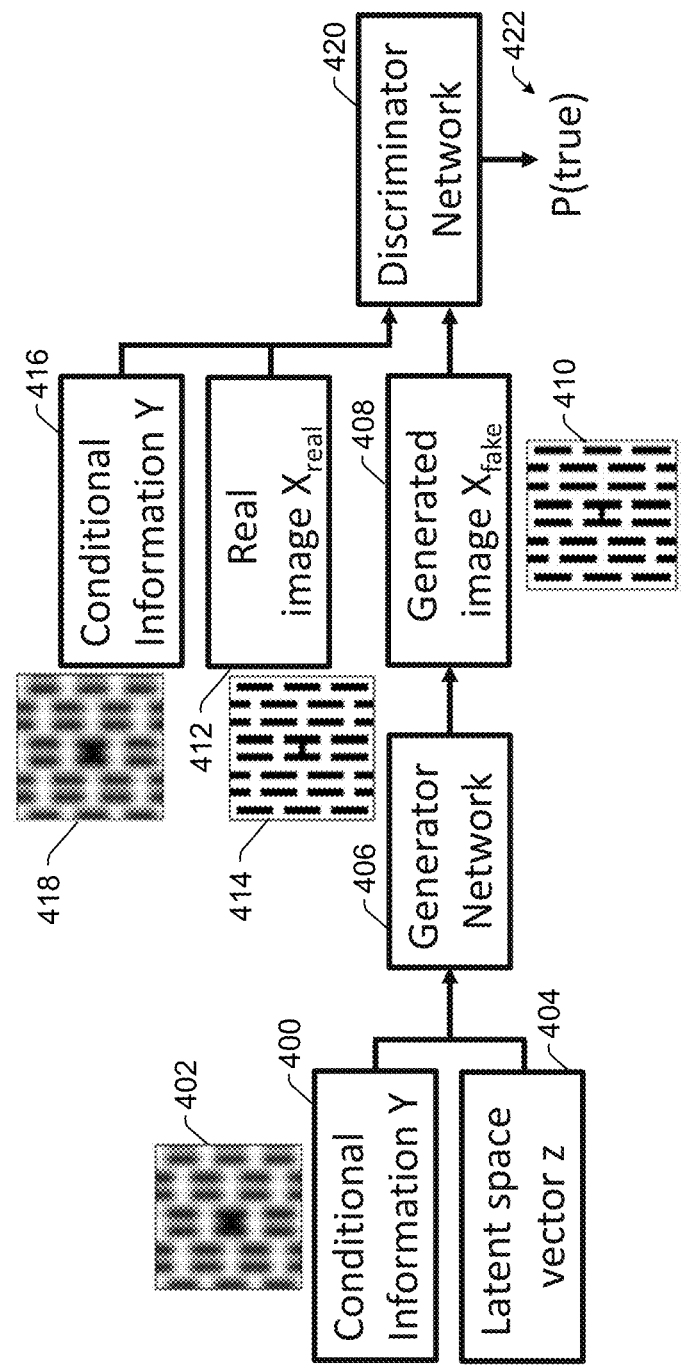

If the first type of information is a specimen image, then the second type of information is design data. FIG. 4 shows cGAN training performed by providing the generator with a real specimen image. In particular, as shown in FIG. 4, conditional information Y 400 (e.g., specimen image 402 or a conditional image) is input to generator network 406 along with latent space vector z 404, which may be configured as described above. As a result, generator network 406 outputs generated image $X_{fake}$ 408, which in this case may be fake design clip 410. Real image $X_{real}$ 412, in this case, is actual design clip 414 for a specimen at a location on the specimen at which specimen image 402 is generated. In this manner, conditional information Y 400 such as an actual specimen image may be a training input in a training set, and real image $X_{real}$ 412 may be its corresponding design clip designated as a training output in the training set. Generated image $X_{fake}$ 408 and conditional information Y 400 are combined as a first input to discriminator network 420. Real image $X_{real}$ 412 and conditional information Y 416, (e.g., specimen image 418) are combined as a second input to discriminator network 420. Conditional information Y 400 and 416 are different instances of the same specimen image in this case. The discriminator network may generate output that is input to a loss function (not shown), which may produce output P(True) 422, which is the probability that the generated design clips are true or good "faked" design clips. The loss function may be configured as described above. The generator and discriminator networks shown in FIG. 4 may be further configured as described herein.

Figure 5:
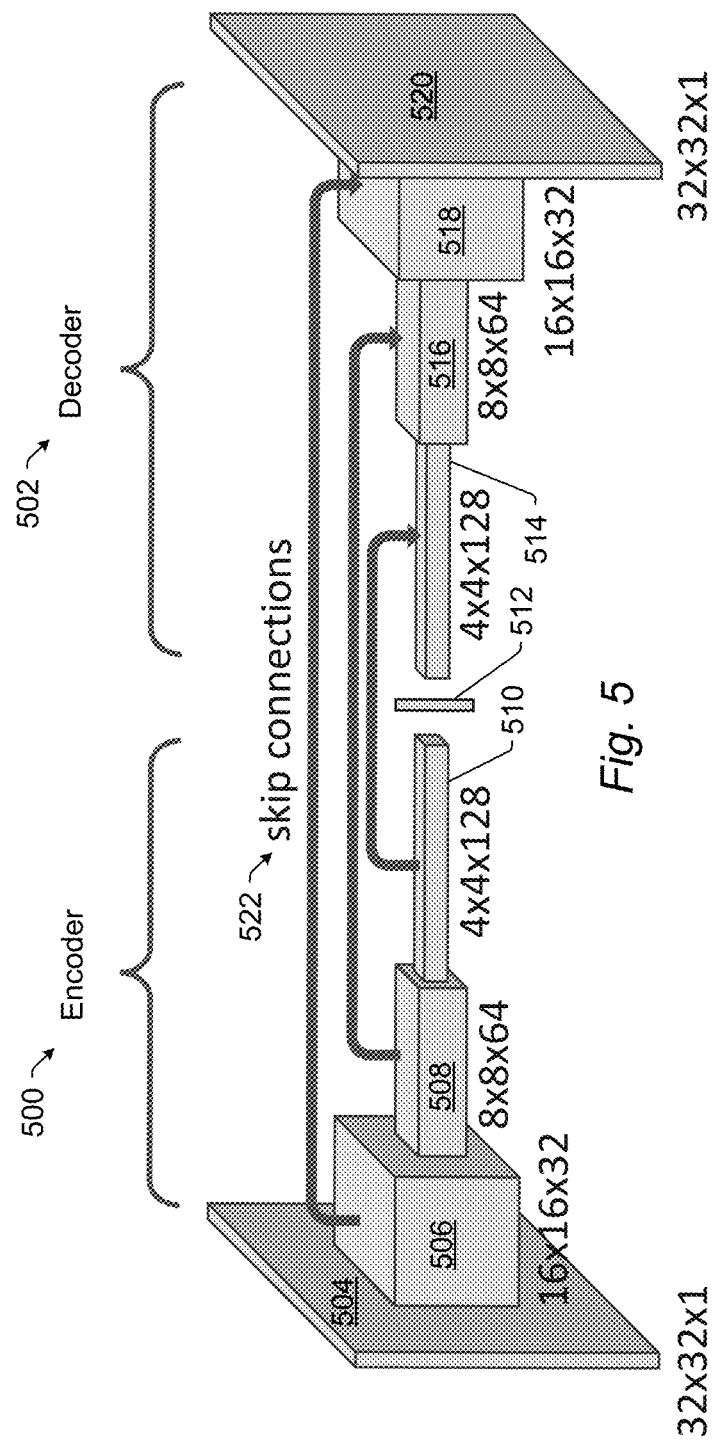
FIG. 5 is a schematic diagram illustrating one example of a generator that may be included in an embodiment of a generative adversarial network (GAN)

An example of a generator that may be included in embodiments of a GAN configured as described herein is shown in FIG. 5. In general, the GAN may include an encoder-decoder network that is progressively down sampling until a bottle neck layer and then the process is reversed. As shown in FIG. 5, the generator may include encoder 500 and decoder 502. Each of the blocks 506, 508, and 510 shown in encoder 500 represent an example of final output layer size after repeated convolution, batch normalization, and rectified linear unit (ReLU) activation and applying max pooling in the end of each section. Although encoder 500 is shown in FIG. 5 as including 3 blocks, the encoder may include any suitable number of blocks, which may be determined in any suitable manner known in the art. In addition, each of the blocks, convolution layer(s), batch normalization layer(s), ReLU layer(s), and pooling layer(s) may have any suitable configuration known in the art. Input 504, which is in the embodiments described herein the first actual information, may be input into block 506, whose output may be input to block 508, and so on. The encoder may generate feature layer 512.

The decoder may also include multiple blocks that perform different functions on feature layer 512 input to the decoder. Each of blocks 514, 516, and 518 in the decoder represent an example of final output layer size after repeating upsampling (transposed convolution) and ReLU activation. Although decoder 502 is shown in FIG. 5 as including 3 blocks, the decoder may include any suitable number of blocks, which may be determined in any suitable manner known in the art. Each of the blocks and upsampling and ReLU layer(s) included in the decoder may have any suitable configuration known in the art. Feature layer 512 generated by the encoder may be input to block 514, whose output may be input to block 516, and so on. Output 520 of the decoder may be any of the transformed first actual information described herein.

In some instances, the GAN may include skip connections 522 between corresponding blocks in the encoder and decoder, e.g., between blocks 506 and 518, between blocks 508 and 516, and between blocks 510 and 514. Connections can be skipped to transfer low-level information that has been learned between the blocks. The skip connections may have any suitable configuration determined in any suitable manner known in the art. The numbers below the input and output in FIG. 5 indicate the size of the input and output, respectively. The numbers below the blocks in the encoder indicate the size of the outputs of the blocks, and the numbers below the blocks in the decoder indicate the size of the inputs to each of the blocks.

Figure 6:
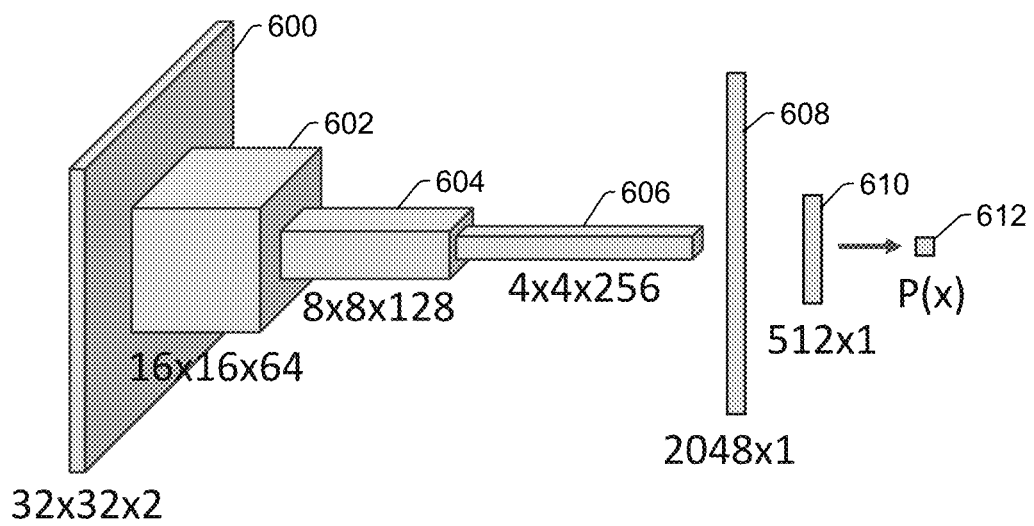
FIG. 6 is a schematic diagram illustrating one example of a discriminator that may be included in an embodiment of a GAN.

An example of a discriminator that may be included in embodiments of a GAN configured as described herein is shown in FIG. 6. Input 600 to the discriminator may include two images (not shown in FIG. 6), one generated by the generator of the GAN and the original image. The discriminator may include a number of layers including layers 602, 604, 606, 608, and 610, each of which may include some combination of convolution, ReLU, and max pooling layers. The convolution, ReLU, and max pooling layers may have any suitable configuration known in the art. Output 612 of the discriminator may be P(x), the probability of how well the simulated image (i.e., the transformed first actual information) matches the original image (i.e., the second actual information) or the probability that the simulated image is a good "faked" image or a bad "faked" image. The numbers below the input in FIG. 6 indicate the size of the input. The numbers below the layers in the discriminator indicate the size of the outputs of the layers. Although the discriminator is shown in FIG. 6 with a particular number of layers, the discriminator included in the GANs of the embodiments described herein may have any suitable number of layers determined in any suitable manner known in the art.

Additional description of the general architecture and configuration of GANs and cGANs can be found in "Generative Adversarial Nets" Goodfellow et al., arXiv: 1406.2661, Jun. 10, 2014, 9 pages, "Semi-supervised Learning with Deep Generative Models," Kingma et al., NIPS 2014, Oct. 31, 2014, pp. 1-9, "Conditional Generative Adversarial Nets," Mirza et al., arXiv:1411.1784, Nov. 6, 2014, 7 pages, "Adversarial Autoencoders," Makhzani et al., arXiv:1511.05644v2, May 25, 2016, 16 pages, and "Image-to-Image Translation with Conditional Adversarial Networks," by Isola et al., arXiv:1611.07004v2, Nov. 22, 2017, 17 pages, which are incorporated by reference as if fully set forth herein. The embodiments described herein may be further configured as described in these references.

The deep generative models described herein may or may not be trained by the one or more computer subsystems and/or one of the component(s) executed by the computer subsystem(s). For example, another method or system may train the deep generative model, which then may be stored for use as the component(s) executed by the computer subsystem(s). The deep generative model may also be trained or built anytime prior to runtime. In one such example, the deep generative model may be built during PDA training or setup. The deep generative models described herein may also be updated, retrained, or revised at any time after setup and/or deployment of a trained model.

Figure 7:
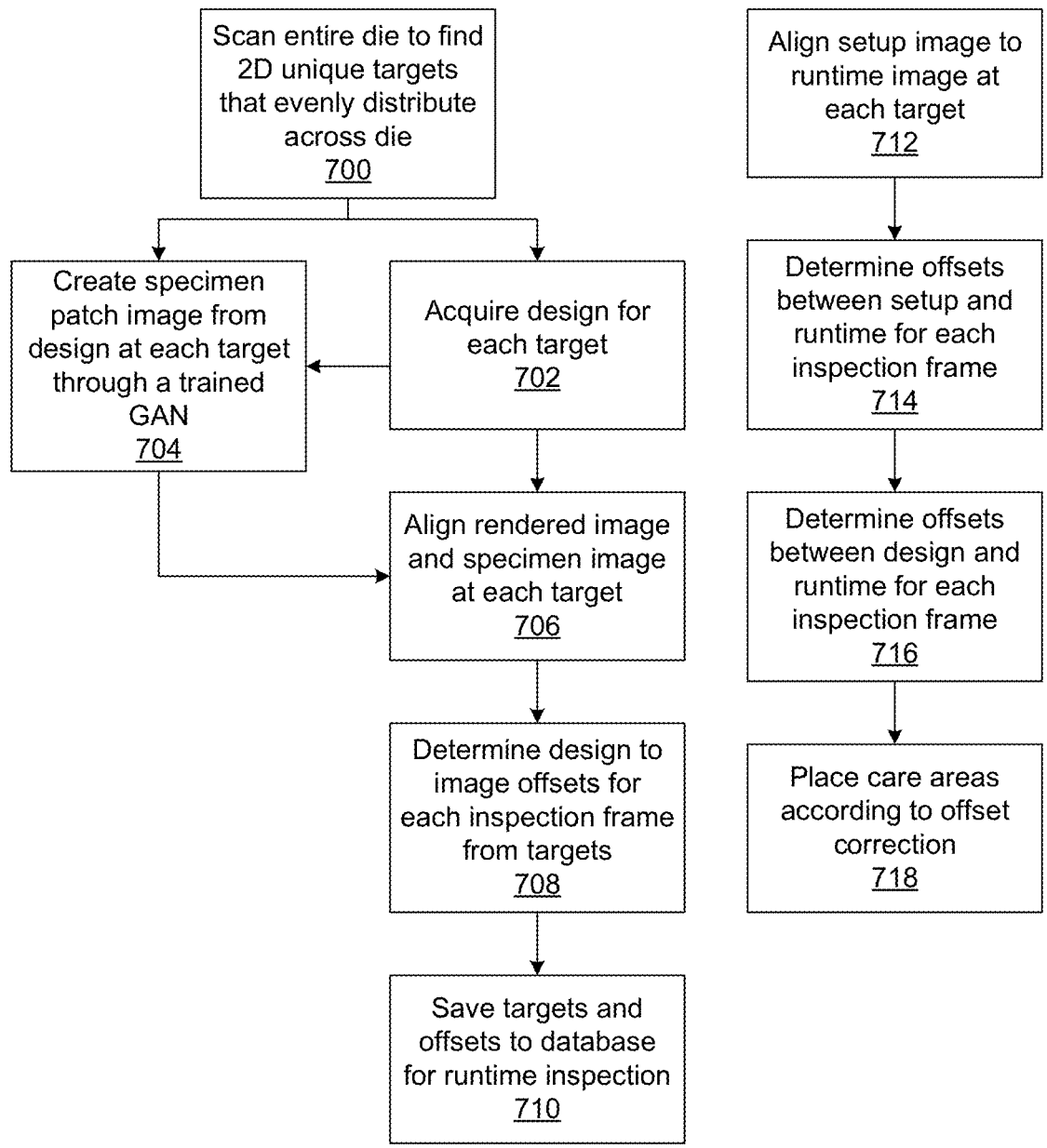
FIGS. 7-8 are flow charts illustrating steps that may be performed by the embodiments described herein.
Figure 8:
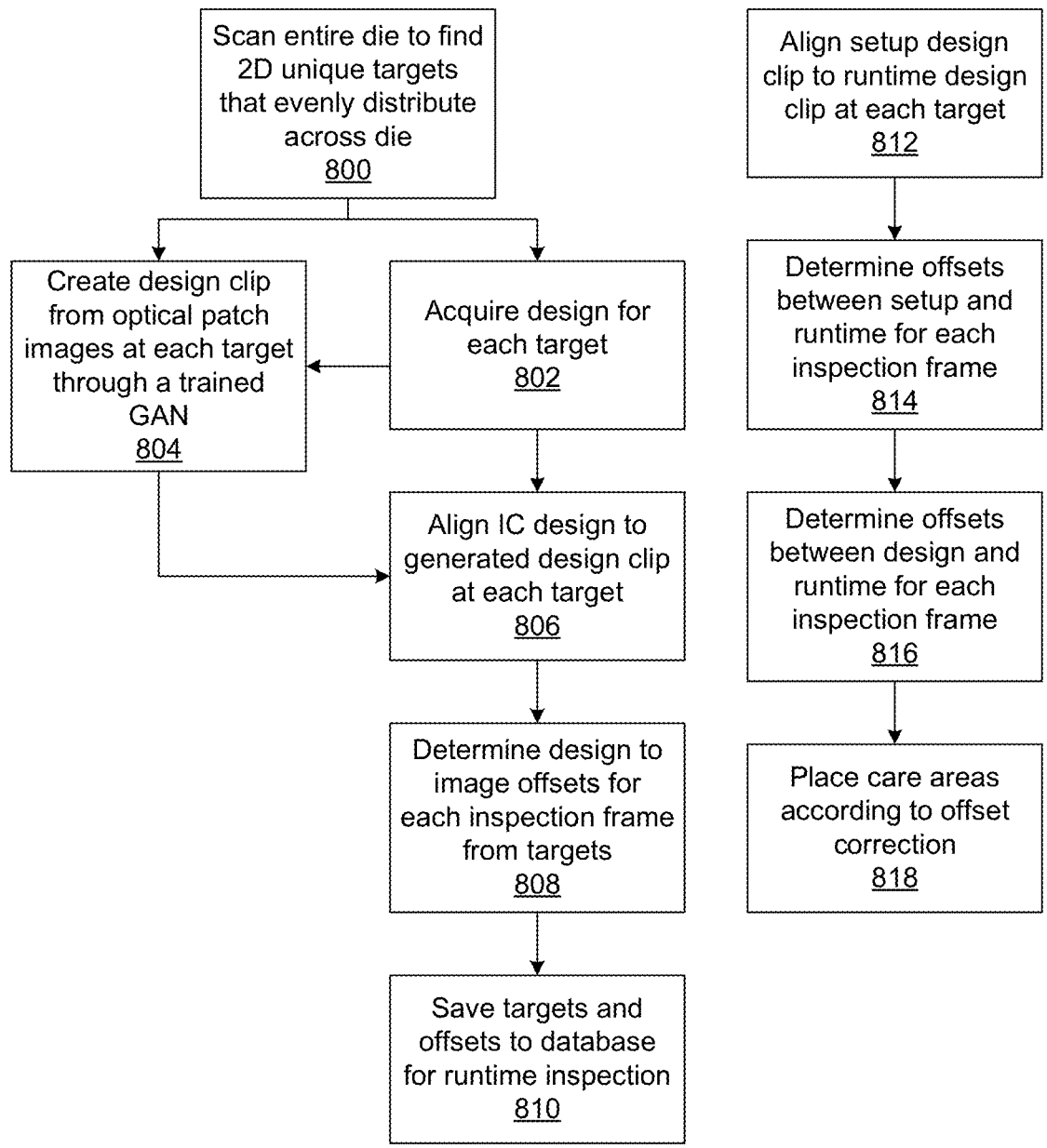

In one such example, FIG. 7 shows a flow chart of steps that may be performed by the embodiments described herein when they are configured for using a deep generative model to transform design to specimen images. Steps 700, 702, 704, 706, 708, and 710 are performed during setup, and steps 712, 714, 716, and 718 are performed during runtime. In contrast, FIG. 8 shows a flow chart of steps that may be performed by the embodiments described herein when they are configured for using a deep generative model to transform specimen images to design. Steps 800, 802, 804, 806, 808, and 810 are performed during setup, and steps 812, 814, 816, and 818 are performed during runtime.

In one embodiment, the computer subsystem(s) are configured for selecting the alignment target from setup images of the specimen generated with the output acquisition subsystem. For example, regardless of whether the deep generative model is configured for transforming specimen images to design data or design data to specimen images, the computer subsystem(s) may select alignment target(s) for use in training and runtime. The alignment target(s) selected for training and runtime may or may not be the same. For example, training and runtime may be performed using the same alignment target, but with fewer instances of the alignment target for training versus runtime. The opposite is also possible. The alignment target(s) selected by the computer subsystem(s) may also include different alignment targets having different characteristics other than just different positions on the specimen or in the design. The alignment target(s) may be selected as described further herein or in any other suitable manner known in the art.

Examples of design-based alignment are described in U.S. Pat. No. 9,830,421 to Bhattacharyya et al. issued Nov. 28, 2017, U.S. Pat. No. 10,620,135 to Brauer issued Apr. 14, 2020, and U.S. Pat. No. 10,698,325 to Brauer issued Jun. 30, 2020, which are incorporated by reference as if fully set forth herein. The embodiments described herein may be configured to select alignment targets as described in these patents and may be further configured as described in these patents.

As shown in step 700 of FIG. 7 and step 800 of FIG. 8, the computer subsystem(s) may scan an entire die to find 2D unique targets that evenly distribute across the die. Scanning an entire die on a specimen or another suitable area on a specimen may be performed as described further herein. The unique targets may be unique in any suitable manner known in the art that renders the targets suitable for alignment purposes. The 2D unique targets may be found in any suitable manner (e.g., by searching within a predetermined image window for patterns that are unlike any others in the window). For example, the unique targets may be a pattern that has a unique shape compared to other patterns within a predetermined search window such as an image frame or job, patterns that have a unique spatial relationship with respect to each other within the predetermined search window, etc.

The alignment targets are preferably 2D in that they can be used to perform alignment in both the x and y directions, although that is not necessary. For example, the alignment targets may be selected so that one or more are useful for alignment in only the x direction and one or more others are useful for alignment in only the y direction.

In addition, although it may be preferable to find and use alignment targets that are evenly distributed across a die or other area on the specimen, that is also not necessary. In other words, although alignment targets may be selected as shown in steps 700 and 800 of FIGS. 7 and 8, respectively, the embodiments described herein may be used with any suitable alignment targets known in the art that are selected in any suitable manner known in the art. Although it may be practical to select multiple unique targets for use in the embodiments described herein, in general, any one or more unique targets may be selected. Each of the unique targets may be different from each other in any unique way. In addition, the unique targets may include more than one instance of the same unique target.

The one or more computer subsystems may receive the design for each of the unique target(s) found in the specimen images. The one or more computer subsystems may receive the design in any suitable manner such as by searching a design for the specimen based on information for the unique target(s) determined from the images generated by the scanning, by requesting a portion of a design (e.g., a design clip) at the position(s) of the unique target(s) from a storage medium or computer system that contains the design, etc. The design that is received by the one or more computer subsystems may include any of the design, design data, or design information described further herein.

In another embodiment, the computer subsystem(s) are configured for generating a training set that includes training images of the specimen generated with the output acquisition subsystem and corresponding design data for the specimen and training the deep generative model with the training set, and the training images are generated at locations independent of locations of the alignment target or any other alignment targets on the specimen. For example, the deep generative models described herein can learn from structures even if the structures used for learning are not good alignment sites for traditional PDA techniques. In other words, although alignment targets are necessary for other steps described herein, the training of the deep generative model does not have to be performed using only alignment target images and design or even any alignment target images and design. Being able to train the deep generative model with essentially any specimen images that can be correlated to design data is advantageous particularly in situations in which there are not many suitable alignment targets on a specimen. In other words, there can be instances in which the number of possible alignment targets on a specimen makes generating an alignment target only training set difficult or even impossible. In such (and any other) cases, the training set may include non-alignment target images and design data to ensure that the deep generative model can be properly trained.

In an additional embodiment, the computer subsystem(s) are configured for generating a training set that includes training images of the specimen generated with the output acquisition subsystem and corresponding design data for the specimen and training the deep generative model with the training set, and the corresponding design data included in the training set includes design data for fewer than all layers on the specimen that impact the training images. For example, the embodiments described herein provide highly accurate alignment without the need to know all the layer information perfectly. Being able to generate specimen images from less than all of the design data that has an effect on the specimen images (or vice versa) is advantageous because in many instances the entire design file is not available in situations such as those described herein. In other situations, it may be difficult to know a priori which design layers have an effect on specimen images and therefore should be used for forward type simulations. In contrast, the deep generative models described herein will be able to generate simulated specimen images from design data (or vice versa) as long as the design data used for training the deep generative model at least somewhat corresponds to the specimen images used for training. In other words, due to the nature of the deep generative models themselves, the embodiments described herein should be able to successfully generate a trained deep generative model even if the design data used for training is missing some of the patterned features that appear in or have an impact on the specimen images.

In any of the embodiments described herein, generating a training set may include storing the training images and corresponding design data in any suitable manner and with any suitable format such that the training set can be used for training a deep generative model. The computer subsystem(s) may store information for the training set in any of the computer readable storage media described herein. The training set may be used by the computer subsystem(s) in any suitable manner known in the art including being split into subsets for training and verification, being updated, modified, or replaced over time or when the process changes, etc.

A deep generative model may then be trained based on a training set that includes specimen patch images with corresponding design clips. Whether the specimen images are the training inputs and the corresponding design clips are the training outputs or vice versa will depend on how the deep generative model will transform the first actual information and the types of information that the first actual information and the second actual information are. The training may include inputting the training inputs into the deep generative model and altering one or more parameters of the deep generative model until the output produced by the deep generative model matches (or substantially matches) the training outputs. Training may include altering any one or more trainable parameters of the deep generative model. For example, the one or more parameters of the deep generative model that are trained by the embodiments described herein may include one or more weights for any layer of the deep generative model that has trainable weights. In one such example, the weights may include weights for convolution layers but not pooling layers.

Although some embodiments are described herein with respect to a deep generative model, the embodiments described herein may include or use multiple deep generative models. In one such example, different deep generative models may be trained and used as described herein for different modes, respectively, of the output acquisition subsystem. For example, alignment performed for one mode may not necessarily be transferrable to another mode. In other words, by performing alignment for one mode, not all of the modes may be aligned to design (or at least not aligned to design with sufficient accuracy). In most cases, different modes of an inspection or other imaging tool will produce images and/or output that are different from each other in one of several possible ways, e.g., noise levels, contrast, resolution, image type (e.g., DF vs. BF, optical vs. electron beam, etc.), and the like. Therefore, if a deep generative model is trained for one mode of a tool, chances are it will be unsuitably trained to transform information for another mode of the tool. As such, multiple deep generative models may be separately and independently trained, one for each mode of interest, and image-to-design alignment may be separately and independently performed for different modes used in a single process performed on a specimen. In this manner, when different modes are used to generate images for a specimen, the images generated in more than one mode may be aligned to the design for the specimen. The same pre-trained deep generative network may be used for each mode although that is not necessary. Each trained deep generative model may then be used to perform mode specific transformations.

When the first actual information is design data, the first actual information input to each differently trained deep generative model may be the same design clips or different portions of the same design since the design of the specimen will not change from mode to mode. When the first actual information is specimen images, then the input to each differently trained deep generative model will be different.

When the first type of information is design data, and the second type of information is specimen images, the generator is trained to produce specimen images that cannot be distinguished from real specimen images. When the first type of information is specimen images and the second type of information is design data, the generator is trained to produce design clips that cannot be distinguished from real design clips. In either case, the adversarially trained discriminator is trained to classify between fakes and real tuples during training.

Once the deep generative model is trained, it can be used to transform first actual information for an alignment target from one type of information to another. For example, as shown in FIG. 7, which is an embodiment in which the first type of information is design data and the second type of information is a specimen image, the one or more computer subsystems may acquire design for each target, as shown in step 702, which may be performed as described further herein. The one or more computer subsystems may then create a specimen patch image from design at each target through a trained GAN, as shown in step 704. In this manner, a GAN or another deep generative model described herein may be used to generate faked specimen images for any given design clip, which will then be used for aligning the specimen images to calculate the offset, as described further herein. In other words, after training, the generator is used to create the simulated specimen images for pattern to design alignment (PDA) so that the actual specimen images can be aligned to simulated specimen images and thereby their corresponding design clips.

In this manner, one new feature of the embodiments described herein is that they can be configured for using a GAN or other deep generative model described herein for learning how artificial patch images should look like based on a design file. In addition, another new feature of the embodiments described herein is that they can be configured for generating artificial patch images for PDA through a GAN or other deep generative model described herein.

In order to perform the opposite, the design clips are replaced by the specimen images and vice versa. For example, as shown in FIG. 8, which is an embodiment in which the first type of information is specimen images and the second type of information is design data, the one or more computer subsystems may acquire design for each target, as shown in step 802, which may be performed as described further herein. The one or more computer subsystems may then create a design clip from optical (or other) patch images at each target through a trained GAN (or other dep generative model described herein), as shown in step 804. In this manner, the GAN (or other deep generative) model is used to generate faked design clips of any given patch image which will then be used for aligning the faked design clips to the actual design clips to calculate the offset between them, which may be performed as described further herein.

In this manner, one new feature of the embodiments described herein is that they may be configured for generating design clips from specimen images through a GAN or other deep generative model-based image reconstruction. In addition, another new feature of the embodiments described herein is that they may be configured for using design clips for alignment instead of specimen images.

In one embodiment, the specimen image is a low resolution specimen image. For example, for processes such as inspection, the images generated of the specimen during the process may be "low resolution" in that they have a lower resolution than the other to type of information being used by the embodiments described herein. In other words, when one type of information in the embodiments described herein is design data and the other type of information is specimen images, even though design data is not generally thought to have a resolution, the specimen images may have a lower (and even much lower) resolution than the design data. For example, unlike the design data in which all of the features of the specimen are perfectly resolved, in the specimen images described herein, not all (or even none) of the features on the specimen may be resolved. In this manner, the transformations described herein are not merely altering the format of the data or image (e.g., from binary to gray scale) or applying one or more filters to the data or images (e.g., like a low pass filter or a corner rounding filter), but involve transforming one type of data or image to another entirely different type of data or image. In this manner, the embodiments described herein can advantageously provide better alignment for specimens such as wafers that have a design to optical mismatch (such as differences in appearance) that makes aligning the design directly to the specimen images impractical or even impossible.

In another embodiment, when the second type of information is the design data, the transforming includes binarizing output of the deep generative model such that the transformed first actual information includes binarized design data. For example, the output of the deep generative model may include a gray scale simulated design data image. In such embodiments, the one or more computer subsystems may be configured for generating binarized design data (or a simulated binary design data image) from the gray scale simulated design data image. Therefore, the transforming step may include inputting the first actual information into the deep generative model and then binarizing the output of the deep generative model. Although one particularly suitable way for generating the simulated binary design data image is described further herein, the computer subsystem(s) may generate the simulated binary design data image in any other suitable manner known in the art.

In one embodiment, generating the simulated binary design data image includes thresholding the gray scale simulated design data image to binarize the gray scale simulated design data image and match nominal dimensions of patterned features in the gray scale simulated design data image to nominal dimensions of patterned features in the design data for the specimen. For example, usually ground truth design images are binary or tri-level (depending on whether the design images are for only one layer on the specimen or two layers on the specimen), and the rendered gray scale design image generated by the deep generative model may have substantially large histogram peaks corresponding to the ground truth image values. To perform alignment using the rendered design images generated by the deep generative model, the computer subsystem(s) may threshold the rendered design images into the binary or tri-level values corresponding to the ground truth. In some such instances, the computer subsystem(s) may generate a histogram of gray scale values in the gray scale simulated design data image and then apply a threshold to the histogram to thereby binarize the image. Threshold values are selected to match the pattern widths (or other dimensions) of features in the design. In this manner, the computer subsystem(s) may threshold the simulated database image to binarize and match the nominal true design pattern width (or other dimensions) and then, as described further herein, align it from the true design pattern. In other words, to use the simulated design data image for alignment, the computer subsystem(s) may threshold the simulated design clip to match the high resolution image design rule (DR) width.

The one or more computer subsystems are also configured for aligning the transformed first actual information to second actual information for the alignment target. The second actual information is the second type of information. For example, in the case in which the first type of information is design data, and the second type of information is specimen images, as shown in FIG. 7, the one or more computer subsystems align the rendered image (i.e., the transformed first actual information) and the specimen image at each target (i.e., the second actual information), as shown in step 706. In contrast, in the case in which the first type of information is specimen images, and the second type of information is design data, as shown in step 806 of FIG. 8, the one or more computer subsystems align IC design (i.e., second actual information) to generated design clip (i.e., transformed first actual information) at each target.

In some embodiments, aligning the transformed first actual information to the second actual information is performed based on a normalized sum of squared differences (NSSD). For example, step 706 of FIG. 7 and step 806 of FIG. 8 may be performed using NSSD of the transformed first actual information and the second actual information to calculate alignment offset. NSSD may be performed using any suitable method, algorithm, function, etc. known in the art. These aligning steps may however be performed using any other suitable alignment method or algorithm known in the art.

The one or more computer subsystems are further configured for determining an offset between the transformed first actual information and the second actual information based on results of the aligning. This offset may be determined in any suitable manner and may be expressed in any suitable manner (e.g., as a Cartesian offset, as a two-dimensional function, etc.). This offset may be determined in any suitable manner known in the art and may have any format known in the art.

In some embodiments, the transforming and aligning steps are performed for additional alignment targets on the specimen and determining the offset includes determining different offsets for different frames, respectively, of output generated for the specimen by the output acquisition subsystem during the process. For example, as shown in step 708 of FIG. 7 and step 808 of FIG. 8, the one or more computer subsystems may determine design-to-image offsets for each inspection frame from targets.

The one or more computer subsystems are also configured for storing the determined offset as an align-to-design offset for use in a process performed on the specimen with an output acquisition subsystem. The computer subsystem(s) may store the align-to-design offset in any suitable computer-readable storage medium. The align-to-design offset may be stored with any of the results described herein and may be stored in any manner known in the art. The storage medium may include any storage medium described herein or any other suitable storage medium known in the art. After the align-to-design offset has been stored, the align-to-design offset can be accessed in the storage medium and used by any of the method or system embodiments described herein, formatted for display to a user, used by another software module, method, or system, etc.

In some embodiments, the transforming and aligning steps are performed for additional alignment targets on the specimen, determining the offset includes determining different offsets for different frames, respectively, of output generated for the specimen by the output acquisition subsystem during the process, and storing the determined offset includes storing the different offsets. In another embodiment, the one or more computer subsystems are configured for storing the second actual information for the alignment target for use as a setup alignment target image in the process performed on the specimen with the output acquisition subsystem. For example, as shown in step 710 of FIG. 7 and step 810 of FIG. 8, the one or more computer subsystems may save targets and offsets to a database for runtime inspection (or another process described herein). These steps may be performed as described further herein.

In one embodiment, storing the align-to-design offset includes storing the align-to-design offset for use in the process performed on the specimen and the process performed on at least one other specimen of the same type as the specimen. For example, the embodiments described herein may set up alignment of a specimen for a process recipe, which may be performed as part of setting up, creating, calibrating, or updating the recipe. That recipe may then be stored and used by the embodiments described herein (and/or another system or method) to perform the process on the specimen and/or other specimens to thereby generate information (e.g., defect information) for the specimen and/or other specimens. In this manner, the align-to-design offset may be generated and stored once per specimen layer, and the align-to-design offset may be used for the process performed on multiple specimens of the same layer. Of course, as in any process, if the process performed on the specimen layer is updated, calibrated, modified, retrained, etc., the align-to-design offset may also be updated, calibrated, modified, retrained, etc. in the same manner as any other process parameter. Updating, calibrating, modifying, retraining, etc. the align-to-design offset may be performed in the same manner described herein for determining an offset for use in a process performed on a specimen. In this manner, the embodiments described herein may be configured for repeating the steps described herein at various times to modify a previously setup process.

The embodiments described herein may also perform the process after the specimen has been aligned in runtime as described above. In one embodiment, the process is an inspection process. However, the process may include any of those described herein such as inspection, defect review, metrology, and the like. The computer subsystem(s) may be configured for storing information for the specimen generated by performing the process such as information for detected defects in any suitable computer-readable storage medium. The information may be stored with any of the results described herein and may be stored in any manner known in the art. The storage medium may include any storage medium described herein or any other suitable storage medium known in the art. After the information has been stored, the information can be accessed in the storage medium and used by any of the method or system embodiments described herein, formatted for display to a user, used by another software module, method, or system, etc.

As described herein, therefore, the embodiments can be used to setup a new process or recipe. The embodiments may also be used to modify an existing process or recipe, whether that is a process or recipe that was used for the specimen or was created for one specimen and is being adapted for another specimen. In addition, the embodiments described herein are not limited to inspection process creation or modification. For example, the embodiments described herein can also be used to setup or modify a process for metrology, defect review, etc. in a similar manner. In particular, determining an offset for use in a process and performing specimen-to-design alignment as described herein can be performed regardless of the process that is being setup or revised. The embodiments described herein can therefore be used not just for setting up or modifying an inspection process but can be used for setting up or modifying any quality control type process performed on the specimens described herein.

In one such embodiment, the one or more computer subsystems are configured to perform the process on the specimen with the output acquisition subsystem, and the process includes aligning a runtime alignment target image generated for the specimen in the process to the setup alignment target image, the runtime alignment target image is the second type of information, determining a runtime-to-setup offset based on results of aligning the runtime alignment target image to the setup alignment target image, and determining a runtime-to-design offset based on the runtime-to-setup offset and the align-to-design offset. For example, as shown in step 712 of FIG. 7, during the process, the one or more computer subsystems may align a setup image to a runtime image at each target. In this embodiment, therefore, the setup image is the rendered specimen image and the runtime image is the actual specimen image. In contrast, as shown in step 812 of FIG. 8, during the process, the one or more computer subsystems may align a setup design clip to a runtime design clip at each target. In this embodiment, therefore, the setup image is the actual design data, and the runtime image is the rendered design data generated from runtime specimen images. As further shown in step 714 of FIG. 7 and step 814 of FIG. 8, the one or more computer subsystems may determine offsets between setup and runtime for each inspection frame. In addition, as shown in step 716 of FIG. 7 and step 816 of FIG. 8, the one or more computer subsystems may determine offsets between design and runtime for each inspection frame. All of these steps may be performed as described further herein.

Determining a runtime-to-design offset based on the runtime-to-setup offset and the align-to-design offset may include modifying the align-to-design offset by or with the runtime-to-setup offset in any suitable manner. This step may be performed to correct the align-to-design offset for any differences in the alignment of the setup specimen and the runtime specimen to the output acquisition subsystem and any other differences between the setup specimen and the runtime specimen such as placement differences in the alignment targets on different specimens.

In some such embodiments, the computer subsystem(s) are configured for generating the runtime alignment target image by transforming a specimen image generated at a location of the alignment target on the specimen during the process into runtime alignment target design data by inputting the specimen image generated at the location of the alignment target on the specimen during the process into the deep generative model. For example, at runtime, the GAN or other deep generative model described herein generates faked design clips from specimen images, which are then aligned to the PDA setup database images.

In another such embodiment, the process includes determining care areas in output generated by the output acquisition subsystem during the process performed on the specimen based on the runtime-to-design offset. For example, as shown in step 718 of FIG. 7 and step 818 of FIG. 8, the one or more computer subsystems may place care areas according to offset correction. "Care areas" as they are commonly referred to in the art are areas on a specimen that are of interest for inspection purposes. Sometimes, care areas are used to differentiate between areas on the specimen that are inspected from areas on the specimen that are not inspected in an inspection process. In addition, care areas are sometimes used to differentiate between areas on the specimen that are to be inspected with one or more different parameters. For example, if a first area of a specimen is more critical than a second area on the specimen, the first area may be inspected with a higher sensitivity than the second area so that defects are detected in the first area with a higher sensitivity. Other parameters of an inspection process can be altered from care area to care area in a similar manner.

In these embodiments, the one or more computer subsystems may use 0 care area border in x and y directions. For example, because the embodiments described herein can align specimen images to design with substantially high accuracy, the care areas can be located in the specimen images with substantially high accuracy. Therefore, a border, which is commonly used to increase a care area artificially to account for any errors in care area placement, can be effectively eliminated by the embodiments described herein. Placing the care areas with such high accuracy and eliminating the care area border is advantageous for a number of reasons including that the detection of nuisance on the specimen can be significantly reduced and the detection of defects of interest (DOIs) on the specimen can be improved.

In one embodiment, the computer subsystem(s) are configured for storing the determined offset as the align-to-design offset for use in the process performed on additional specimens with the output acquisition subsystem, and when the second type of information is the design data, the transformed first actual information is more immune to variations in one or more processes performed on the additional specimens than if the second type of information is the specimen image. For example, when the deep generative model is configured for transforming specimen images to design data, the design images that are generated from the specimen images could potentially be more immune to process variation than if the deep generative model is configured for generating specimen images from design data.

In another embodiment, the computer subsystem(s) are configured for storing the determined offset as the align-to-design offset for use in the process performed on additional specimens with the output acquisition subsystem, and when the second type of information is the design data, alignment performed in the process using the align-to-design offset is more immune to variations in one or more processes performed on the additional specimens than if the second type of information is the specimen image. For example, performing PDA on a binarized design rendering with the true design clip may be more immune to process variation than if PDA is performed using specimen images.

Results and information generated by performing the processes described herein on the specimen or other specimens of the same type may be used in a variety of manners by the embodiments described herein and/or other systems and methods. Such functions include, but are not limited to, altering a process such as a fabrication process or step that was or will be performed on the specimen or another specimen in a feedback or feedforward manner. For example, the computer subsystem(s) may be configured to determine one or more changes to a process that was or will be performed on a specimen inspected as described herein based on the detected defect(s). The changes to the process to may include any suitable changes to one or more parameters of the process. The computer subsystem(s) preferably determine those changes such that the defects can be reduced or prevented on other specimens on which the revised process is performed, the defects can be corrected or eliminated on the specimen in another process performed on the specimen, the defects can be compensated for in another process performed on the specimen, etc. The computer subsystem(s) may determine such changes in any suitable manner known in the art.

Those changes can then be sent to a semiconductor fabrication system (not shown) or a storage medium (not shown) accessible to the computer subsystem(s) and the semiconductor fabrication system. The semiconductor fabrication system may or may not be part of the system embodiments described herein. For example, the computer subsystem(s) and/or output acquisition subsystem described herein may be coupled to the semiconductor fabrication system, e.g., via one or more common elements such as a housing, a power supply, a specimen handling device or mechanism, etc. The semiconductor fabrication system may include any semiconductor fabrication system known in the art such as a lithography tool, an etch tool, a chemical-mechanical polishing (CMP) tool, a deposition tool, and the like.

Each of the embodiments of each of the systems described above may be combined together into one single embodiment.

Another embodiment relates to a computer-implemented method for determining an offset for use in a process performed on a specimen. The method includes the transforming, aligning, determining, and storing steps described further herein. These steps are performed by one or more computer systems. One or more components are executed by the one or more computer systems, and the one or more components include a deep generative model.

Each of the steps of the method may be performed as described further herein. The method may also include any other step(s) that can be performed by the system, computer system(s), and/or deep generative models described herein. The computer system(s) may be configured according to any of the embodiments described herein, e.g., computer subsystem(s) 102. The deep generative model may be configured according to any of the embodiments described herein. In addition, the method described above may be performed by any of the system embodiments described herein.

Figures 9, 10:
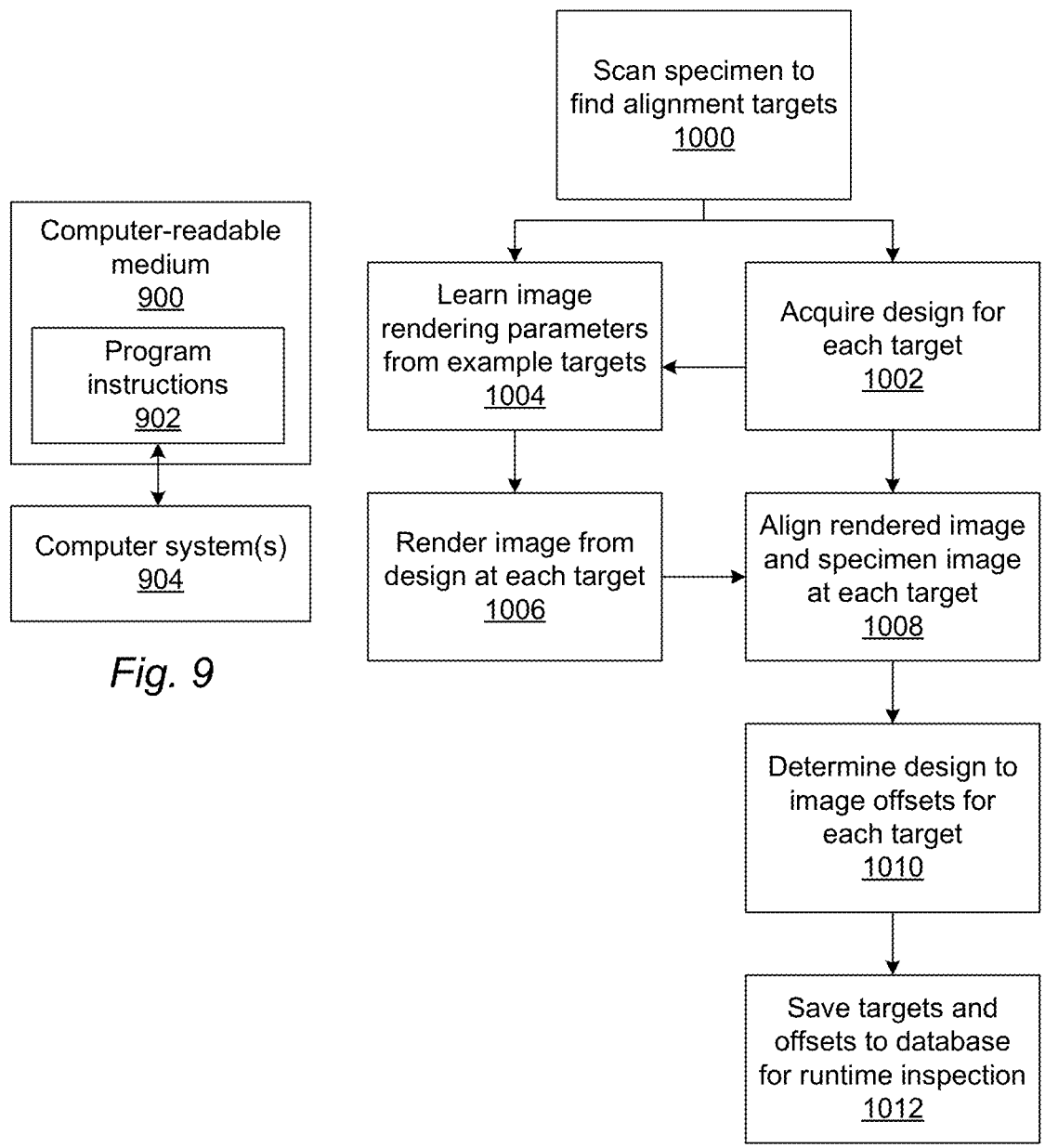
FIG. 9 is a block diagram illustrating one embodiment of a non-transitory computer-readable medium storing program instructions for causing computer system(s) to perform a computer-implemented method described herein.
FIG. 10 is a flow chart illustrating steps that may be performed by currently used systems and methods.

An additional embodiment relates to a non-transitory computer-readable medium storing program instructions executable on one or more computer systems for performing a computer-implemented method for determining an offset for use in a process performed on a specimen. One such embodiment is shown in FIG. 9. In particular, as shown in FIG. 9, non-transitory computer-readable medium 900 includes program instructions 902 executable on computer system(s) 904. The computer-implemented method may include any step(s) of any method(s) described herein.

Program instructions 902 implementing methods such as those described herein may be stored on computer-readable medium 900. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes ("MFC"), SSE (Streaming SIMD Extension) or other technologies or methodologies, as desired.

Computer system(s) 904 may be configured according to any of the embodiments described herein.

Further modifications and alternative embodiments of various aspects of the invention will be apparent to those skilled in the art in view of this description. For example, methods and systems for determining an offset for use in a process performed on a specimen are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A system configured to determine an offset for use in a process performed on a specimen, comprising:
 one or more computer subsystems; and
 one or more components executed by the one or more computer subsystems, wherein the one or more components comprise a deep generative model; and
 wherein the one or more computer subsystems are configured for:
  transforming first actual information for an alignment target on a specimen from a first type of information to a second type of information by inputting the first actual information into the deep generative model;
  aligning the transformed first actual information to second actual information for the alignment target, wherein the second actual information is the second type of information;
  determining an offset between the transformed first actual information and the second actual information based on results of said aligning; and
  storing the determined offset as an align-to-design offset for use in a process performed on the specimen with an output acquisition subsystem.

2. The system of claim 1, wherein the one or more computer subsystems are further configured for selecting the alignment target from setup images of the specimen generated with the output acquisition subsystem.

3. The system of claim 1, wherein the one or more computer subsystems are further configured for generating a training set comprising training images of the specimen generated with the output acquisition subsystem and corresponding design data for the specimen and training the deep generative model with the training set, and wherein the training images are generated at locations independent of locations of the alignment target or any other alignment targets on the specimen.

4. The system of claim 1, wherein the one or more computer subsystems are further configured for generating a training set comprising training images of the specimen generated with the output acquisition subsystem and corresponding design data for the specimen and training the deep generative model with the training set, and wherein the corresponding design data included in the training set comprises design data for fewer than all layers on the specimen that impact the training images.

5. The system of claim 1, wherein the first type of information or the second type of information is a specimen image, and wherein the specimen image is a low resolution specimen image.

6. The system of claim 1, wherein the one or more computer subsystems are further configured for storing the determined offset as the align-to-design offset for use in the process performed on additional specimens with the output acquisition subsystem, wherein the second type of information is design data, and wherein the transformed first actual information is more immune to variations in one or more processes performed on the additional specimens than if the second type of information is a specimen image.

7. The system of claim 1, wherein the one or more computer subsystems are further configured for storing the determined offset as the align-to-design offset for use in the process performed on additional specimens with the output acquisition subsystem, wherein the second type of information is design data, and wherein alignment performed in the process using the align-to-design offset is more immune to variations in one or more processes performed on the additional specimens than if the second type of information is a specimen image.

8. The system of claim 1, wherein the second type of information is design data, and wherein said transforming further comprises binarizing output of the deep generative model such that the transformed first actual information comprises binarized design data.

9. The system of claim 1, wherein said transforming and aligning are performed for additional alignment targets on the specimen, wherein said determining the offset comprises determining different offsets for different frames, respectively, of output generated for the specimen by the output acquisition subsystem during the process, and wherein storing the determined offset comprises storing the different offsets.

10. The system of claim 1, wherein the one or more computer subsystems are further configured for storing the second actual information for the alignment target for use as a setup alignment target image in the process performed on the specimen with the output acquisition subsystem.

11. The system of claim 10, wherein the one or more computer subsystems are further configured to perform the process on the specimen with the output acquisition subsystem, and wherein the process comprises aligning a runtime alignment target image generated for the specimen in the process to the setup alignment target image, wherein the runtime alignment target image is the second type of information, determining a runtime-to-setup offset based on results of aligning the runtime alignment target image to the setup alignment target image, and determining a runtime-to-design offset based on the runtime-to-setup offset and the align-to-design offset.

12. The system of claim 11, wherein the one or more computer subsystems are further configured for generating the runtime alignment target image by transforming a specimen image generated at a location of the alignment target on the specimen during the process into runtime alignment target design data by inputting the specimen image generated at the location of the alignment target on the specimen during the process into the deep generative model.

13. The system of claim 11, wherein the process further comprises determining care areas in output generated by the output acquisition subsystem during the process performed on the specimen based on the runtime-to-design offset.

14. The system of claim 1, wherein the deep generative model is a generative adversarial network.

15. The system of claim 1, wherein the deep generative model is a conditional generative adversarial network.

16. The system of claim 1, wherein the process is an inspection process.

17. The system of claim 1, wherein the output acquisition subsystem is a light-based output acquisition subsystem.

18. The system of claim 1, wherein the output acquisition subsystem is an electron beam output acquisition subsystem.

19. A non-transitory computer-readable medium, storing program instructions executable on one or more computer systems for performing a computer-implemented method for determining an offset for use in a process performed on a specimen, wherein the computer-implemented method comprises:
    transforming first actual information for an alignment target on a specimen from a first type of information to a second type of information by inputting the first actual information into a deep generative model, wherein one or more components are executed by the one or more computer systems, and wherein the one or more components comprise the deep generative model;
    aligning the transformed first actual information to second actual information for the alignment target, wherein the second actual information is the second type of information;
    determining an offset between the transformed first actual information and the second actual information based on results of said aligning; and
    storing the determined offset as an align-to-design offset for use in a process performed on the specimen with an output acquisition subsystem, wherein said inputting, aligning, determining, and storing are performed by the one or more computer systems.

20. A computer-implemented method for determining an offset for use in a process performed on a specimen, comprising:
    transforming first actual information for an alignment target on a specimen from a first type of information to a second type of information by inputting the first actual information into a deep generative model, wherein one or more components are executed by one or more computer systems, and wherein the one or more components comprise the deep generative model;
    aligning the transformed first actual information to second actual information for the alignment target, wherein the second actual information is the second type of information;
    determining an offset between the transformed first actual information and the second actual information based on results of said aligning; and
    storing the determined offset as an align-to-design offset for use in a process performed on the specimen with an output acquisition subsystem, wherein said inputting, aligning, determining, and storing are performed by the one or more computer systems.

21. The system of claim 1, wherein the first type of information is design data and the second type of information is a specimen image.

22. The system of claim 1, wherein the first type of information is a specimen image and the second type of information is design data.

* * * * *